(12) United States Patent
Pruthi et al.

(10) Patent No.: US 9,128,853 B1
(45) Date of Patent: Sep. 8, 2015

(54) LOOKUP STRUCTURE FOR LARGE BLOCK CACHE

(75) Inventors: Arvind Pruthi, Los Gatos, CA (US);
Sandeep Karmarkar, Pune (IN);
Kanishk Rastogi, Pune (IN)

(73) Assignee: Toshiba Corporation, Tokyo (JP)

( * ) Notice: Subject to any disclaimer, the term of this patent is extended or adjusted under 35 U.S.C. 154(b) by 563 days.

(21) Appl. No.: 13/045,690

(22) Filed: Mar. 11, 2011

Related U.S. Application Data

(60) Provisional application No. 61/331,761, filed on May 5, 2010.

(51) Int. Cl.
*G06F 12/10* (2006.01)
*G06F 12/08* (2006.01)

(52) U.S. Cl.
CPC .................................. *G06F 12/0864* (2013.01)

(58) Field of Classification Search
CPC .............. G06F 12/00–12/109; G06F 12/0864; G06F 12/1018; G06F 17/3033; G06F 17/30628; G06F 17/30097; G06F 17/30109
USPC ......... 711/103, 113, 117–119, 122, 200–210, 711/216
See application file for complete search history.

(56) References Cited

U.S. PATENT DOCUMENTS

| | | | | |
|---|---|---|---|---|
| 5,790,828 A | * | 8/1998 | Jost ................................... | 711/4 |
| 5,974,421 A | * | 10/1999 | Krishnaswamy et al. ............ | 1/1 |
| 5,983,329 A | * | 11/1999 | Thaler et al. ................... | 711/163 |
| 7,853,591 B1 | * | 12/2010 | Yang et al. ..................... | 707/736 |
| 8,549,230 B1 | * | 10/2013 | Chatterjee et al. ............. | 711/135 |
| 2003/0154345 A1 | * | 8/2003 | Lyon ............................. | 711/122 |
| 2005/0144223 A1 | * | 6/2005 | Yang et al. ..................... | 709/203 |
| 2005/0177687 A1 | * | 8/2005 | Rao .............................. | 711/118 |
| 2007/0118688 A1 | * | 5/2007 | Lee et al. ...................... | 711/113 |
| 2008/0021908 A1 | * | 1/2008 | Trask et al. ................... | 707/100 |
| 2009/0106486 A1 | * | 4/2009 | Kim et al. ..................... | 711/103 |
| 2011/0082967 A1 | * | 4/2011 | Deshkar et al. ................ | 711/103 |

* cited by examiner

*Primary Examiner* — Aimee Li
*Assistant Examiner* — Nicholas Simonetti
(74) *Attorney, Agent, or Firm* — White & Case LLP

(57) ABSTRACT

Systems, methods, and other embodiments associated with a lookup structure for a large block cache are described. According to one embodiment, at least two blocks of data are stored in a cache. A lookup entry is constructed that describes the at least two blocks of data. The lookup entry includes block specific information that describes individual blocks of the at least two blocks of data. The lookup entry is stored in the lookup structure.

17 Claims, 3 Drawing Sheets

LOOKUP STRUCTURE FOR LARGE BLOCK CACHE

CROSS REFERENCE TO RELATED APPLICATIONS

This application claims the benefit of U.S. provisional application Ser. No. 61/331,761 filed on May 5, 2010, which is hereby wholly incorporated by reference.

BACKGROUND

A block cache is typically used to minimize latencies involved in hard disk based block storage by caching the most utilized blocks in lower latency media like RAM, non-volatile RAM (NVRAM) or Solid State Disks (SSDs). Use of SSDs for caching presents different challenges than RAM based caching. One of those challenges is that SSD based caches can be orders of magnitude larger than RAM based caches. This significant difference in amount of data stored in cache causes existing lookup structures to grow, requiring more memory and making it impractical to accommodate.

SUMMARY

In one embodiment, an apparatus includes a metadata logic configured to construct a lookup entry that describes two or more blocks of data stored in a cache. The lookup entry includes block specific information that describes individual blocks of the at least two or more blocks of data. The apparatus includes a lookup structure logic configured to store the lookup entry in a lookup structure.

In another embodiment, a method includes storing at least two blocks of data in a cache. The method also includes constructing a lookup entry that describes the at least two blocks of data. The lookup entry includes block specific information that describes individual blocks of the at least two blocks of data. The method includes storing the lookup entry in a lookup structure.

In another embodiment, an integrated circuit device includes a metadata logic configured to construct a lookup entry that describes at least two blocks of data stored in a cache. The lookup entry includes block specific information that describes individual blocks of the at least two or more blocks of data. The device also includes a lookup structure logic configured to store the lookup entry in a lookup structure and storage media for storing the lookup structure.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of devices, methods, and other embodiments associated with lookup structures for large block caches. The lookup structures described herein include lookup entries that describe at least two blocks of data in the cache, thereby reducing memory requirements while maintaining low overhead for cache lookups. This allows the lookup structure for a very large cache to be stored in a limited amount of memory (typically RAM or NVRAM) allocated for this purpose. In one embodiment, the lookup structure also supports a two level cache layout and a unified lookup across the two cache levels.

Figure 1:
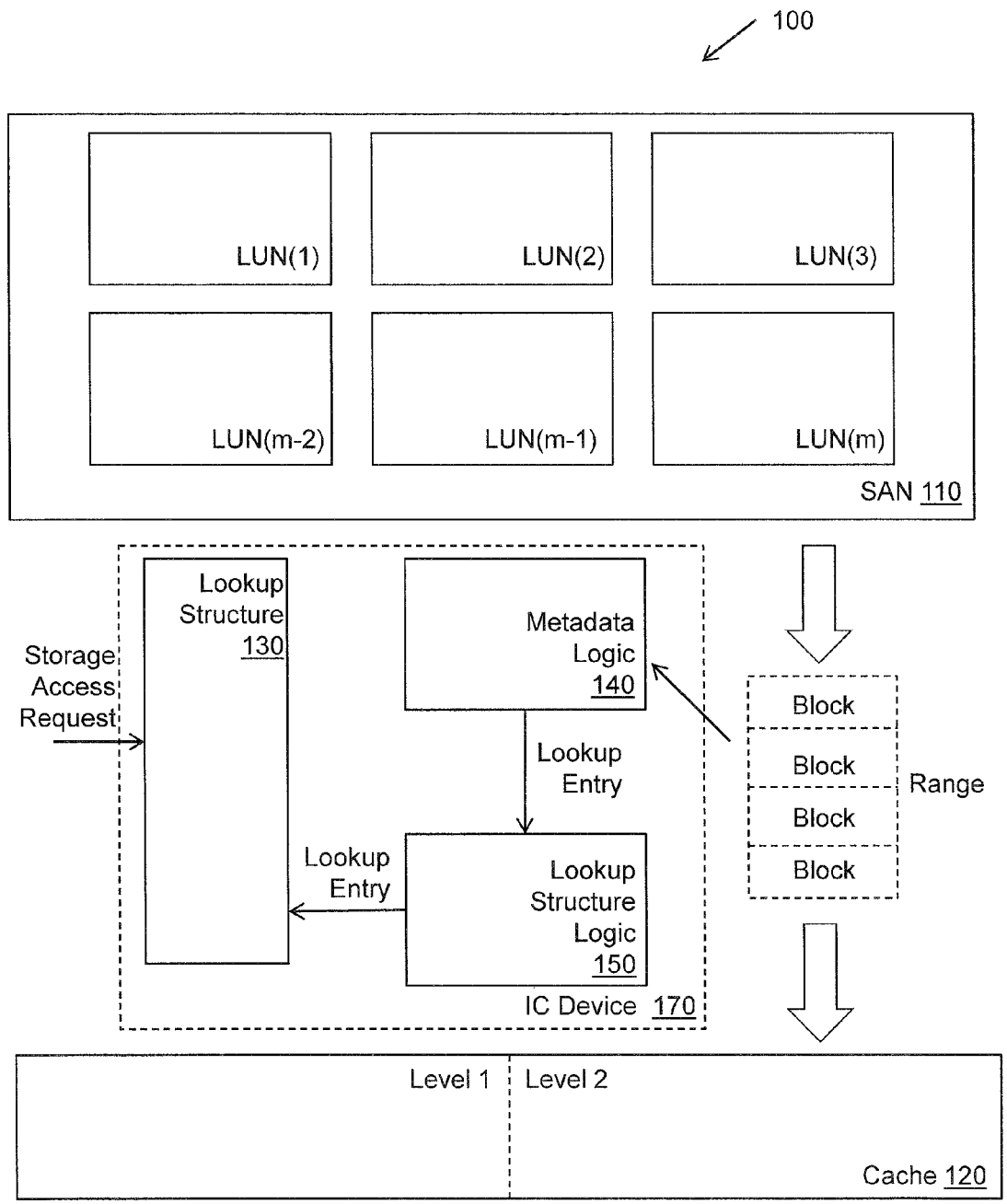
FIG. 1 illustrates one embodiment of a caching system that includes a lookup structure that includes a lookup entry that describes at least two blocks of data.

FIG. 1 illustrates one example embodiment of a caching system 100 that includes a lookup structure 130 storing lookup entries that describe at least two blocks of data. The caching system 100 includes a Storage Area Network (SAN) 110. The SAN 110 is a network of multiple Logical Units (LUNs) that store data. Each LUN is assigned a unique data store identifier that differentiates the LUN from all other LUNs. The data in each LUN is organized in blocks. For example, in one embodiment, a single block of data corresponds to 4 KB of contiguous storage media. According to a caching scheme, ranges of two or more blocks of data from the SAN are periodically moved into (and out of) a cache 120. For the purposes of this description, ranges of 4 contiguous blocks of data (16 KB) are moved at a time into the cache 120 from the SAN 110. The selection of range size will depend on the tendency of a given set of data to clump due to locality of reference. The range size may be chosen to correspond roughly to a clump size.

In one embodiment, the cache 120 is a hybrid cache that includes two levels. Level 1 is a smaller cache that stores most often accessed ranges of data and that is searched first for data. In one embodiment, the Level 1 cache is implemented in faster (and more expensive) NVRAM. Level 2 is a larger cache that is accessed after a cache miss on Level 1. In one embodiment, the Level 2 cache is implemented in a relatively slow and inexpensive device like an SSD. While a two level cache 120 is shown and described, caches having any number of levels can be used in accordance with the lookup structures described herein.

The lookup structure 130 maps the location of data in the cache 120 to the location of data in the SAN 110. The lookup structure is accessed by programs that request data stored in the SAN 110. A storage access request is processed on the lookup structure 130 to determine if the request data is stored in the cache 120. If the data is not in the cache 120, the data will be retrieved from the SAN 110.

The caching system 100 includes a metadata logic 140 that captures metadata about a range of data blocks being transferred from the SAN 110 to the cache 120. The metadata captured by the metadata logic 140 includes information about the entire range of data as well as information about the individual blocks of data. The metadata logic 140 constructs a lookup entry that captures, in a single node, the metadata for the two or more blocks of data in the range and the individual blocks. One example lookup entry, called a "range node", is described in detail below with reference to FIG. 2. A lookup structure logic 150 stores the lookup entry in the lookup structure 130. A lookup structure that is embodied as a hash table is described in detail below with reference to FIG. 2.

In one embodiment, the metadata logic 140, the lookup structure logic 150, and the lookup structure 130 are parts of an integrated circuit device 170. In other embodiments, the lookup structure is not part of the integrated circuit device 170. The metadata logic 140 may include processor-executable instructions stored on a non-transitory processor-readable medium for constructing a lookup entry that describes two or block of data stored in a cache. The lookup entry includes block specific information that describes individual blocks of the at least two blocks of data in the range of offsets. The lookup structure logic 150 may include processor-executable instructions stored on a non-transitory processor-readable medium for storing the lookup entry in the lookup structure.

Figure 2:
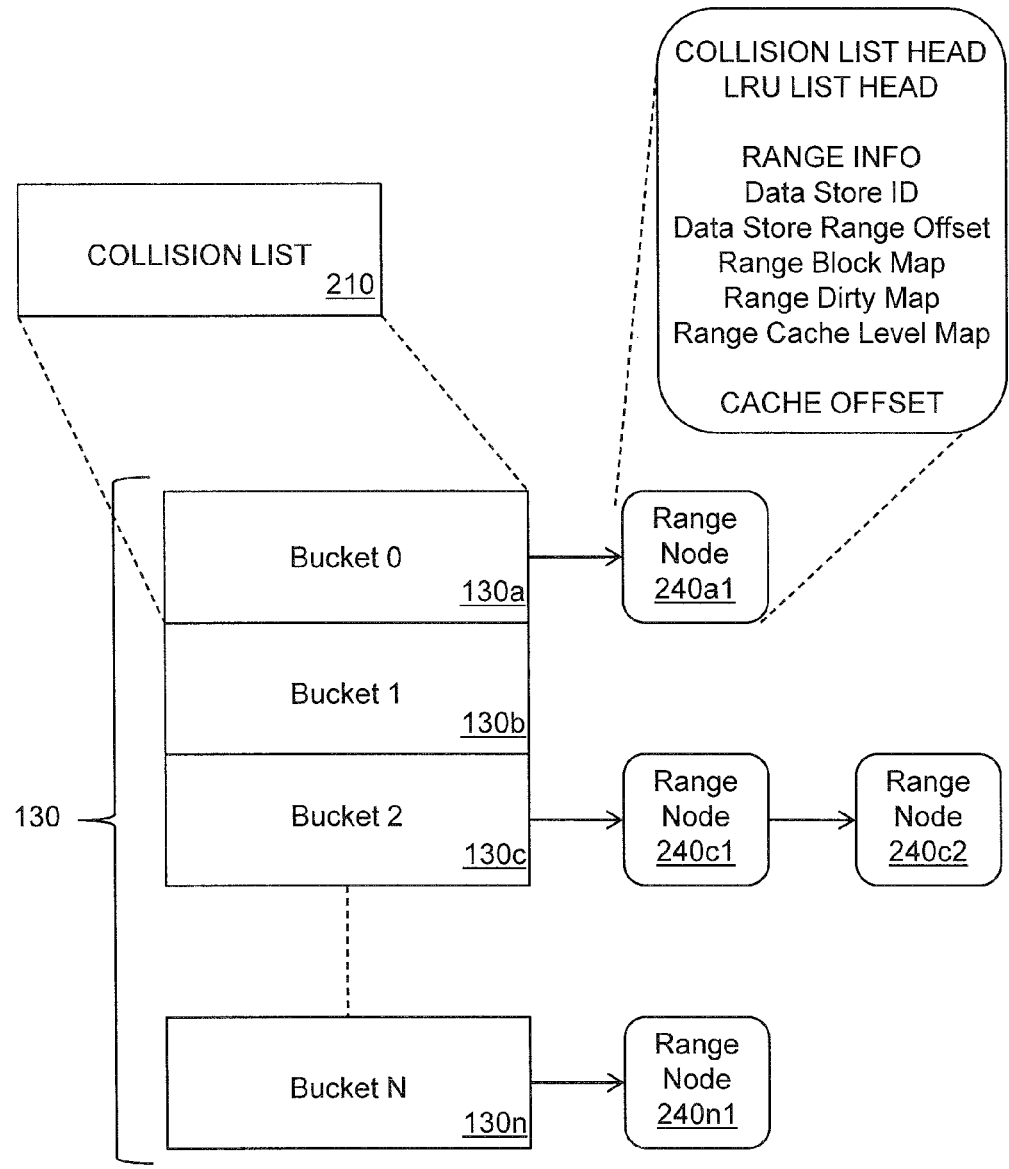
FIG. 2 illustrates one embodiment of a lookup structure that includes a lookup entry that describes at least two blocks of data.

FIG. 2 illustrates a particular embodiment of the lookup structure 130. The lookup structure 130 is a hash table that includes N buckets 130*a*-130*n*. Each bucket stores an entry 210 in the hash table that is a hash value of a data store identifier and range offset of the range of data. The entry 210 identifies a collision list for the hash value. A storage access request would include a requested data store identifier and range offset, and would be similarly hashed to locate a matching bucket entry to determine if the requested data is stored in the cache.

The hash table 130 employs chaining for collision resolution. Accordingly, each bucket points to an associated "collision list" that is a linked list listing cache mapping information for any data store identifier and range offset value combinations stored in the cache that hashed to the bucket's value. Each lookup entry in the collision list is a range node that describes a range of more than one contiguous block of memory. In FIG. 2, bucket 0 has one lookup entry—range node 240*a*1, bucket 1 has no collision list entries, bucket 2 has two collision list entries—range nodes 240*c*1 and 240*c*2, and bucket n has one collision list entry—range node 240*n*1.

FIG. 2 illustrates an example of a range node configuration shown associated with range node 240*a*1. The range node includes information that identifies the collision list with which it is associated and an LRU (least recently used) list head that is used to determine which ranges of data should be swapped out of cache when more cache space is needed. The range node 240*a*1 also includes RANGE information that provides specifics about the range of data blocks and the cache offset location where the range is stored in the cache.

The RANGE information includes a data store ID that identifies a particular data store (LUN) from which the data was transferred and a data store range offset that specifies the beginning location of the range in the data store. The range data also includes three bit maps, each which may have one bit per data block in the range. In the embodiment shown in FIGS. 1 and 2, a range includes 4 blocks of data, so each of the three bit maps includes 4 bits. A Range Block Map is a bit map that indicates whether a given block holds valid data. The Range Block Map is used because although a range worth of contiguous cache blocks are allocated for each range node, it is possible that the range is only partially populated. So, for example, a range node describing data store blocks 4-7 may only have valid data for block 5, while the rest of the blocks are invalid in the cache. In this case, the Range Block Map would have the values "0100" to indicate that only the second block in the range has valid data. Although allocating an entire range worth of cache memory incurs some unnecessary overhead and may waste some cache space when some of the data in the range is not valid, with the correct choice of range size and with locality of reference, it becomes less likely to find partially populated ranges.

A Range Dirty Map is a bit map that indicates whether data in the block has been changed in any way. This allows the lookup structure 130 to support write back. When the range is being moved back into memory, only those blocks indicated as dirty in the Range Dirty Map need to be swapped. A Range Cache Level Map is a bit map that indicates in which level of cache a block of data is stored. In one embodiment, the Range Cache Level Map can either denote cache space from the first or second level of cache. The caching between these two levels is assumed to be exclusive, i.e., a data store range belongs either to the first or second level of cache, but not both. The Range Cache Level Map allows the lookup structure 130 to support a unified lookup between two levels of cache.

A range node can efficiently describe the range by specifying, a single time, information common to all blocks of data in the range, e.g., the collision list identifier, the LRU list head, and the cache offset and using small bit maps within the range node to specify information specific to individual blocks in the data range. As compared to having a collision entry for each block of data, the use of range nodes in the lookup table conserves the memory that would be required to separately store the common information for each block of data in the range. Instead of storing common information multiple times, the range node instead uses small bit maps to differentiate between the blocks in the range. Further, the use of range nodes that store specific information about blocks of data in the range eliminates the need for an Inverse Page Table, which is typically used for describing large caches.

The range node 240*a*1 shown in FIG. 2 is only one example of a lookup structure entry that maps two or more blocks of data in a data store to two or more blocks of data stored in a cache. Other lookup structure entries can be employed. Further, the bit maps that store block specific information (e.g., Range Block Map, Range Dirty Map, Range Cache Level Map) may constructed differently. Other mechanisms for storing block specific information may also be employed.

In one embodiment, the bucket entry is 8 bytes (4 each for the collision list and bucket owner). The range nodes are 24 bytes as follows: Collision List Head (4 bytes), LRU List Head (8 bytes), Cache Offset (4 bytes), and Range information (8 bytes). The 8 bytes of Range information is broken down as follows: Data Store ID (8 bits), Data Store Range Offset (36 bits), Range Block Map (4 bits), Range Dirty Map (4 bits), Range Cache Level (4 bits), and 8 bits are reserved.

Given a 256 GB cache with a cache block size of 4 KB, a range size of 16 KB is selected. 16 million range nodes (256 GB/16 KB) are necessary to describe the 256 GB cache. Each range node consumes 24 bytes so 16 million range nodes would consume 384 MB of memory. Each bucket requires 8 bytes, so using a hash table with 16 million buckets would consume 128 MB of memory for bucket entries. Adding the 128 MB of memory for bucket entries and the 384 MB for range nodes, a total of 512 MB of memory is used for the lookup structure for 256 GB of cache.

Figure 3:
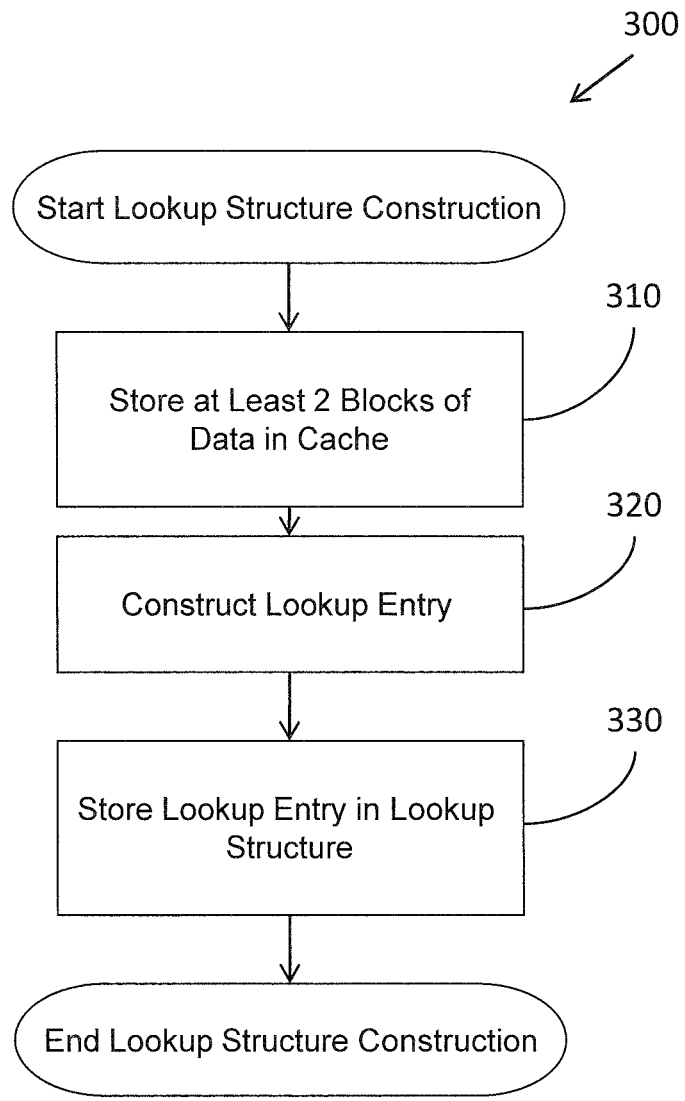
FIG. 3 illustrates one embodiment of a method associated with constructing a lookup structure that includes lookup entries that describes at least two blocks of data.

FIG. 3 illustrates one embodiment of a method 300 that constructs a lookup structure. At 310, the method includes storing at two or more blocks of data in a cache. At 320, a lookup entry is constructed describes the two or more blocks of data. The range node includes block specific information that describes individual blocks of the two or more blocks of data. At 330 the method includes storing the lookup entry in a lookup structure.

In one embodiment, the lookup entry includes a set of bits corresponding to a block map that identifies blocks of data that contain valid data, a set of bits that identifies blocks of data that have been modified since being moved into cache, and/or a set of bits that identifies a level of cache in which a corresponding block of data is stored. In one embodiment, the lookup entry is stored as a collision entry in a hash table. The lookup entry may be stored according to a hash function on a data store identifier and a data store range offset of the two or more blocks of data.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a metadata logic configured to construct one or more lookup entries that describes a range of more than one contiguous block of data stored in a cache; wherein the one or more lookup entries includes, in the same one or more lookup entries, i) block specific information that describes individual blocks of the range of more than one contiguous block of data and ii) common information common to the range of more than one contiguous block of data;
    a lookup structure logic configured to store the one or more lookup entries in a hash table that includes one or more buckets, wherein
    a storage access request is processed on the hash table to determine if requested data is stored in a cache,
    the one or more buckets is configured to store the one or more lookup entries according to a hash function of, at least, cache offset information and a data store identifier,
    the data store identifier identifying a particular data store from which the range of more than one contiguous block of data were transferred,
    the common information includes at least one of LRU list information and the cache offset information, and
    wherein each bucket has an associated collision list which includes the one or more lookup entries and the associated collision list lists cache mapping information corresponding to the data store identifier and the cache offset information.

2. The apparatus of claim 1, wherein the one or more lookup entries includes a set of bits that identifies individual blocks of data that contain valid data.

3. The apparatus of claim 1, wherein the one or more lookup entries includes a set of bits that identifies individual blocks of data that have been modified since being moved into the cache.

4. The apparatus of claim 1, wherein the one or more lookup entries includes a set of bits that identifies a level of the cache in which the range of more than one contiguous block of data are stored.

5. The apparatus of claim 1, wherein the lookup structure logic stores the one or more lookup entries as a single collision entry in the hash table.

6. The apparatus of claim 1, wherein the metadata logic comprises processor-executable instructions stored on a non-transitory medium for constructing the one or more lookup entries.

7. The apparatus of claim 1, wherein the lookup structure logic comprises processor-executable instructions stored on a non-transitory medium for storing the one or more lookup entries in the hash table.

8. The apparatus of claim 1, wherein the common information further includes at least one of collision list information, a range block map, a range dirty map, or a range cache level map.

9. A method, comprising:
    storing a range of more than one contiguous block of data;
    constructing one or more lookup entries that describes the range of more than one contiguous block of data; and
    further wherein the one or more lookup entries includes, in the same one or more lookup entries, i) block specific information that describes individual blocks of the range of more than one contiguous block of data and ii) collision list information common to the range of more than one contiguous block of data; and
    storing the one or more lookup entries in a hash table that includes one or more buckets, wherein
    a storage access request is processed on the hash table to determine if requested data is stored in a cache,
    the one or more buckets is configured to store the one or more lookup entries according to a hash function of, at least, cache offset information and a data store identifier of the range of more than one contiguous block of data,
    the one or more buckets further configured to point to an associated collision list and the associated collision list lists cache mapping information corresponding to the data store identifier and the cache offset information, and
    the data store identifier identifying a particular data store from which the range of more than one contiguous block of data were transferred.

10. The method of claim 9, comprising constructing the one or more lookup entries that includes a set of bits that identifies blocks of data that contain valid data.

11. The method of claim 9, comprising constructing the one or more lookup entries that includes a set of bits that identifies individual blocks of data that have been modified since being moved into the cache.

12. The method of claim 9, comprising constructing the one or more lookup entries that includes a set of bits that identifies a level of the cache in which the range of more than one contiguous block of data are stored.

13. An integrated circuit device, comprising:
a metadata logic configured to construct one or more lookup entries that describes a range of more than one contiguous block of data stored in a cache; and wherein the one or more lookup entries includes, in the same one or more lookup entries, i) block specific information that describes individual blocks of the range of more than one contiguous block of data and ii) cache offset information common to the range of more than one contiguous block of data, such that a same set of bits in the one or more lookup entries describe the range of more than one contiguous block of data;
a lookup structure logic configured to store the one or more lookup entries in a hash table that includes one or more buckets; and
storage media for storing the hash table,
wherein the lookup structure logic is further configured to process a storage access request on the hash table to determine if requested data is stored in a cache and, store the one or more lookup entries according to a hash function based, at least in part, on a data store identifier and a data store range offset of the range of more than one contiguous block of data, and
the data store identifier identifying a particular data store from which the range of more than one contiguous block of data were transferred, and
wherein the one or more buckets has an associated collision list and the associated collision list lists cache mapping information corresponding to the data store identifier and the data store range offset information.

14. The integrated circuit device of claim 13, further comprising a lookup structure that includes a set of bits that identifies individual blocks of data that contain valid data.

15. The integrated circuit device of claim 13, wherein the one or more lookup entries includes a set of bits that identifies individual blocks of data that have been modified since being moved into the cache.

16. The integrated circuit device of claim 13, wherein the one or more lookup entries includes a set of bits that identifies a level of the cache in which the range of more than one contiguous block of data are stored.

17. The integrated circuit device of claim 13, wherein the lookup structure logic is configured to store the one or more lookup entries as a single entry in the hash table.

* * * * *